March 6, 1951         A. SHULMAN         2,543,998
EDUCATIONAL TOY
Filed May 7, 1947         3 Sheets-Sheet 1
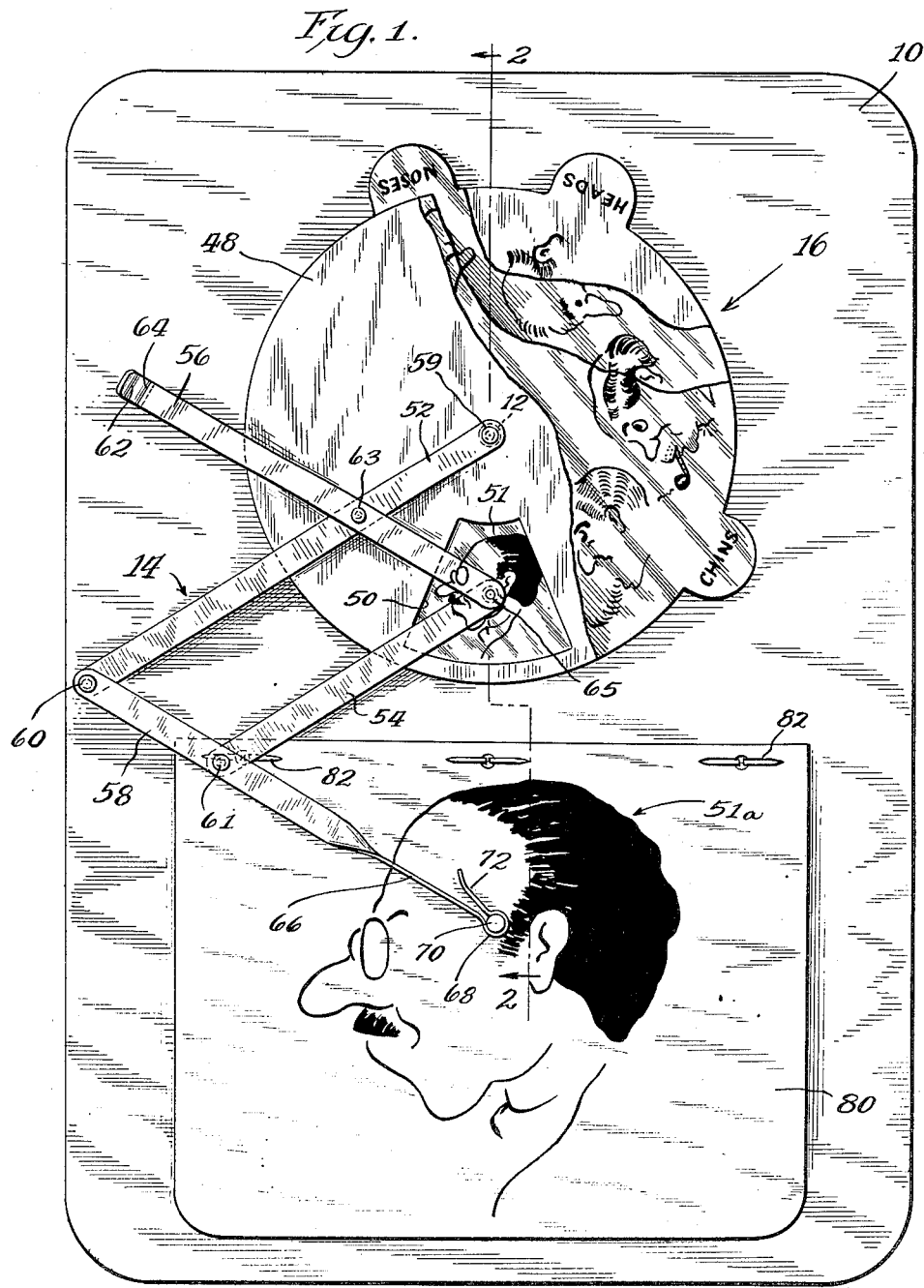
Inventors
Albert Shulman
By Max R. Kraus
Atty.

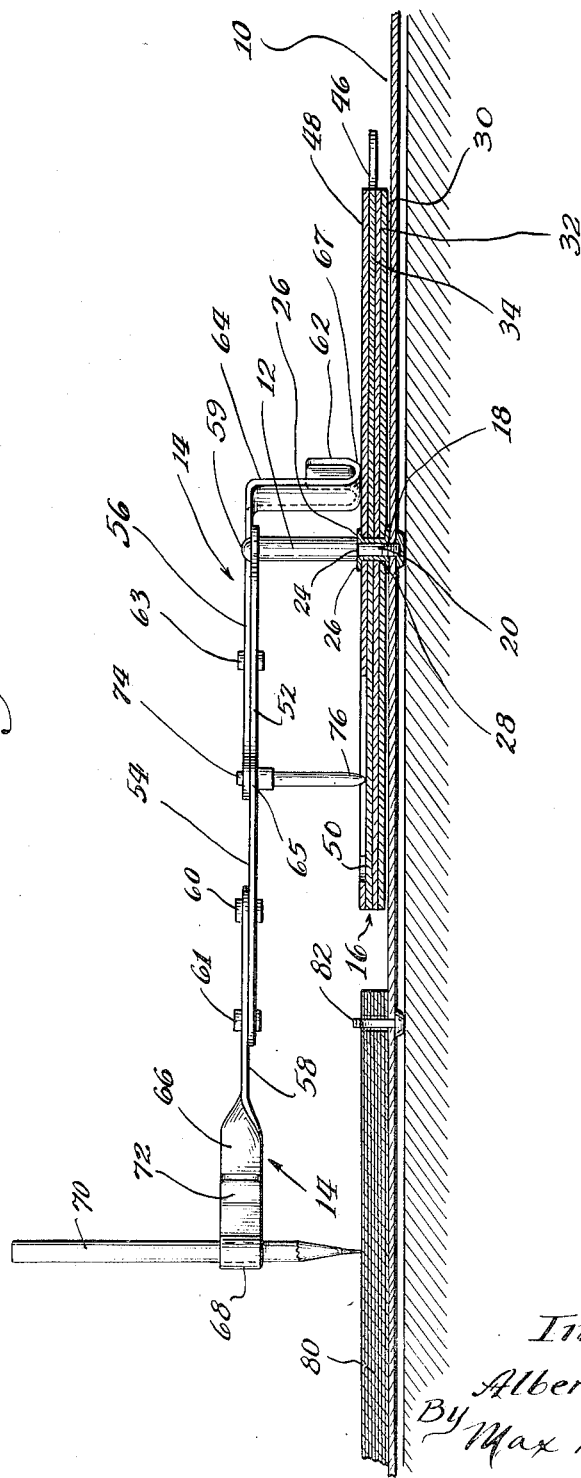

March 6, 1951     A. SHULMAN     2,543,998
EDUCATIONAL TOY
Filed May 7, 1947     3 Sheets-Sheet 3
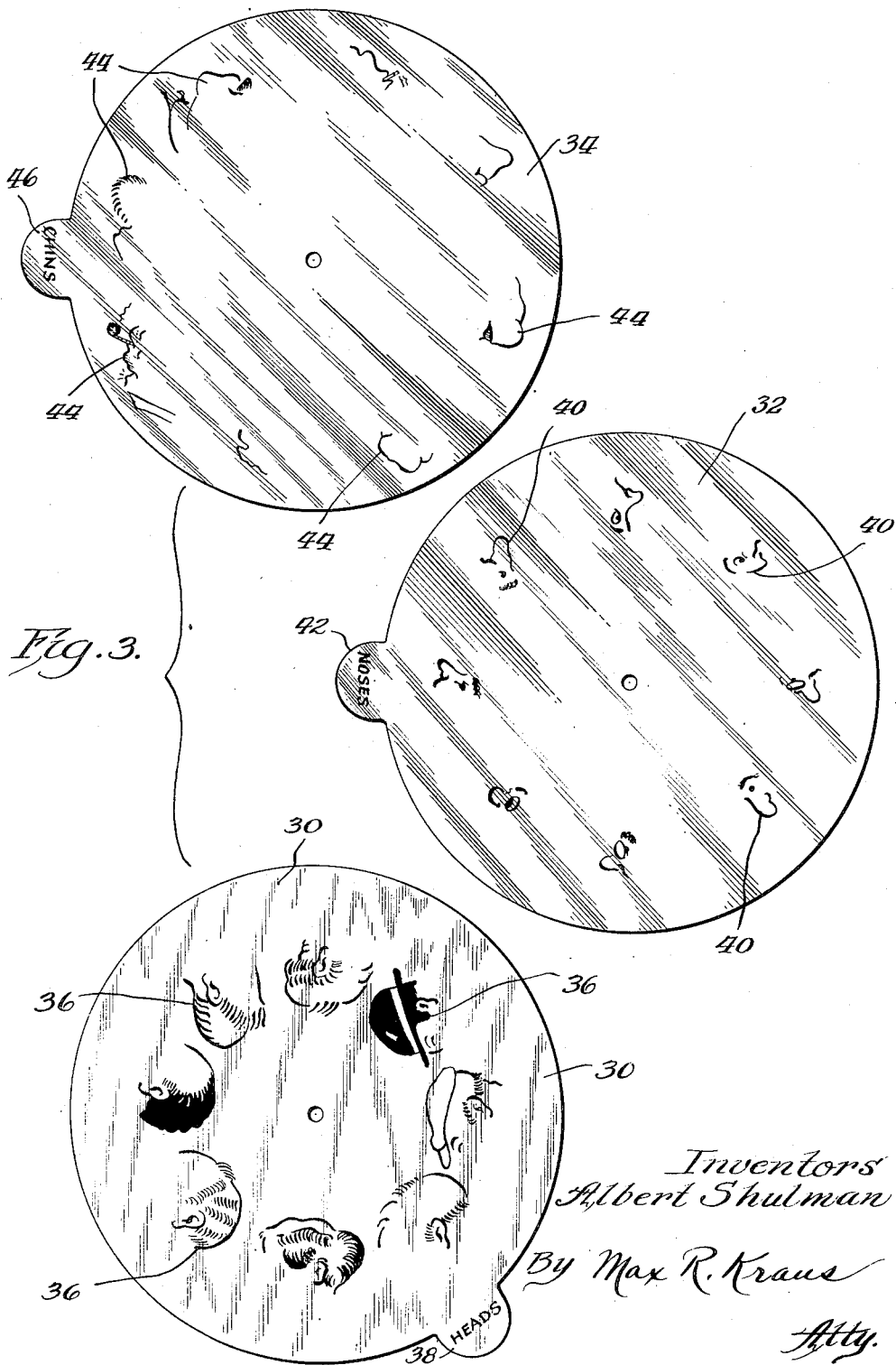

Patented Mar. 6, 1951

2,543,998

UNITED STATES PATENT OFFICE 2,543,998

EDUCATIONAL TOY

Albert Shulman, Chicago, Ill.

Application May 7, 1947, Serial No. 746,492

2 Claims. (Cl. 35—26)

This invention relates to an educational toy and more particularly to a drawing instrument for teaching the tracing and reproduction of faces, comics, caricatures and the like.

One of the objects of this invention is to provide a toy which is educational as well as entertaining.

Another object is to provide a device which can be readily manipulated to form a variety of different composite pictures, caricatures, comics and the like and which can be traced or precisely reproduced.

Another object is to provide a simple and inexpensive device having the foregoing objects.

Other objects will become apparent as this description progresses.

In the drawings:

Fig. 1 is a top plan view of my invention showing a portion of the cartoon or picture forming discs broken away.

Fig. 2 is a view partly in cross section taken on line 2—2 of Fig. 1.

Fig. 3 is a plan view of the three rotatable discs, each having different features of the face, and which when superimposed, form the composite pictures, profiles or facial expressions.

Referring more particularly to the drawings, the base or board 10 of rectangular shape has a post 12 which acts as a pivotal support for the pantograph, generally indicated at 14, and for the rotatable discs which comprise the cartoon or picture forming portion generally indicated at 16. The post 12 is fixedly anchored to the board 10 as at 18 and has a reduced end 20 which supports a sleeve 22, flanged at its opposite ends as at 26 and 28. The shoulder 24 of the post prevents the sleeve from rising on the post.

The cartoon or picture forming portion, generally indicated at 16 is formed of three discs 30, 32 and 34 which are rotatable about the post 12. The lower disc 30, preferably of paper or cardboard, has circumferentially imprinted thereon a plurality of different types of head portions 36. The disc 30 has a tab 38 imprinted with the word "Heads." The discs 32 and 34 are transparent and are made of acetate or Celluloid, with the disc 32 superimposed on the disc 30 and the disc 34 on the disc 32. The disc 32 has circumferentially imprinted thereon a plurality of different types and shapes of noses 40 and has a designation "Noses" tab 42. The disc 34 has circumferentially imprinted thereon a plurality of different types of chins 44 and has a designation "Chins" tab 46. The heads, noses and chins are each circumferentially spaced and positioned with respect to the axis of the discs so that they register properly to form various composite profiles or facial expressions. The discs are each independently rotatable about the post 12 by means of their respective tabs and a multiplicity of different expressions can be formed by merely rotating the discs with respect to each other, thus various pictures, caricatures, comics or cartoons can be thus formulated. With the comparatively few sketches shown in Fig. 3 of the drawings, I can form 512 different facial expressions.

Supported on the post 12 and superimposed on the discs in an opaque disc 48 which has a cutout or window 50 formed substantially like a truncated cone so that only one complete composite picture 51 can be formed to be visible through said opening, with the other possible combinations of expressions completely hidden from view and ready to be successively registered upon rotation of the discs.

The pantograph, generally indicated at 14, consists of four metal bars 52, 54, 56 and 58, movably connected together at four points, 60, 61, 63 and 65. The bar 52 is pivotally connected to the top of the post 12 as at 59. The end of the bar 56 is bent downwardly at right angles as at 62 and then again reversely bent as at 64 to provide a surface 67. This supports one end of the pantograph as it moves over the board 10.

The bar 58 is bent at its end part 66 in a plane at right angles to the bar proper. The end part is reversely bent to provide a curved part 68 to receive and support a pencil 70. The end of the bar 72 is tensioned to properly hold the pencil in position.

A pin 74 serves to pivotally connect the bars 56 and 54 of the pantograph as at 65, and the opposite end of the pin tapers to form a tracing point 76 which moves over the surface of the top disc 34 and within the confines of the window 50 to permit the tracing of the composite picture.

The lower end of the board 10 supports a tablet or sheaf of papers 80 which are secured to the board by fasteners 82. The drawings 51a are reproduced on the sheets 80 which can then be removed from the tablet.

In practice the child or student will manipulate the discs 30, 32 and 34 through the tabs to form a facial expression or comic which will be visible through the window 50. He will then move the pencil or marking instrument over the paper sheet by tracing the picture through the tracing point 76 and the picture 51a will be reproduced on the paper sheet 80 by the pantograph three times the size of the original picture 51. All of the combinations possible by registering the three discs can be reproduced and traced, thereby providing an unlimited number of new and varied, normal and grotesque pictures or comics which can be traced by the pantograph. The child will not only learn to draw by tracing, but is likewise fascinated by the various characters which he is able to formulate.

It will be understood that while I have shown the discs imprinted with various features of the face, discs can be imprinted each with a different part of the body, such as one disc having complete faces, another with body portions and another with the lower limbs, and these made to register, or different parts of animals can be imprinted in the same way. It will be understood that when I refer to the different parts to formulate a composite picture that it includes any and all of the foregoing.

I claim:

1. In an educational device comprising a board having a supporting member, a plurality of discs rotatably supported on said supporting member, certain of said discs being transparent, each disc having imprinted thereon a variety of configurations, each configuration forming a part of a composite picture, said discs adapted to be rotated to register and form a variety of traceable composite pictures, a top opaque cover supported on said supporting member and superposed on said discs and having an opening exposing a single composite picture, a pantograph having its stationary end pivotally secured to said supporting member coaxially with said discs, said pantograph having a tracing point adapted to be moved over said composite picture in said opening, a marking instrument supported by said pantograph and simultaneously movable with the tracing point, and a sheet of paper supported on said board under said marking instrument and upon which the marking instrument imprints.

2. In an educational device as recited in claim 1, said supporting member, opening and said sheet of paper arranged in substantial alinement on said board.

ALBERT SHULMAN.

REFERENCES CITED

The following references are of record in the file of this patent:

UNITED STATES PATENTS

| Number | Name | Date |
| --- | --- | --- |
| 228,062 | Gregory | May 25, 1880 |
| 408,148 | Throop | July 30, 1889 |
| 951,472 | Coffey | Mar. 8, 1910 |
| 1,549,673 | Levva | Aug. 11, 1925 |
| 1,558,041 | Phares | Oct. 20, 1925 |
| 2,021,809 | Plese | Nov. 19, 1935 |